(12) United States Patent
Hoshina (10) Patent No.: US 12,081,860 B2
(45) Date of Patent: Sep. 3, 2024

(54) IMAGE PICKUP APPARATUS

(71) Applicant: CANON KABUSHIKI KAISHA, Tokyo (JP)

(72) Inventor: Takayuki Hoshina, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 18/185,297

(22) Filed: Mar. 16, 2023

(65) Prior Publication Data

US 2023/0308744 A1 Sep. 28, 2023

(30) Foreign Application Priority Data

Mar. 23, 2022 (JP) ................... 2022-046958

(51) Int. Cl.
*H04N 23/63* (2023.01)
*G06V 10/25* (2022.01)
*H04N 23/60* (2023.01)
*H04N 23/65* (2023.01)
*H04N 23/67* (2023.01)

(52) U.S. Cl.
CPC .......... *H04N 23/632* (2023.01); *G06V 10/25* (2022.01); *H04N 23/64* (2023.01); *H04N 23/651* (2023.01); *H04N 23/67* (2023.01); *G06V 2201/07* (2022.01)

(58) Field of Classification Search
CPC .... H04N 23/632; H04N 23/64; H04N 23/651; H04N 23/67; H04N 23/45; H04N 23/667; H04N 25/47; H04N 23/611; G06V 10/25; G06V 2201/07
See application file for complete search history.

(56) References Cited

U.S. PATENT DOCUMENTS

| 9,288,391 | B2 * | 3/2016 | Fujita | .................... H04N 23/667 |
| 2013/0188090 | A1 * | 7/2013 | Saito | .................... H04N 23/632 348/345 |

FOREIGN PATENT DOCUMENTS

JP 2002252804 A 9/2002

* cited by examiner

*Primary Examiner* — Gevell V Selby
(74) *Attorney, Agent, or Firm* — Canon U.S.A., Inc. IP Division (57) ABSTRACT

An image pickup apparatus includes a first image sensor configured to perform imaging, and a control unit configured to perform precapture imaging, when acquiring a first imaging instruction, to cause the first image sensor to repeatedly perform imaging, and causes the first image sensor to perform main imaging when acquiring a second imaging instruction during the precapture imaging, and a first detecting unit configured to detect a change in a main object to be focused, and to output information about the change in the main object. The control unit changes control in the precapture imaging using the information about the change in the main object.

9 Claims, 8 Drawing Sheets

IMAGE PICKUP APPARATUS

BACKGROUND

Technical Field

One of the aspects of the disclosure relates to an image pickup apparatus.

Description of the Related Art

In order to easily capture a desired image, a camera having a so-called "precapture" function has conventionally been proposed which stores temporally continuing images captured just prior to main imaging triggered by a predetermined operation together with actually (normally or formally) captured images (acquired by the main imaging) (see Japanese Patent Laid-Open No. (JP) 2002-252804).

However, the camera disclosed in JP 2002-252804 continues to capture similar images even if a main object does not change during the precapture imaging, and consumes unnecessary power. In addition, due to many unnecessary images stored in a recording unit, the capacity of the recording unit more quickly runs short.

SUMMARY

One of the aspects of the embodiment provides an image pickup apparatus that can easily acquire an image intended by a photographer while suppressing unnecessary power consumption and capacity shortage of a recording unit.

An image pickup apparatus according to one aspect of the disclosure includes a first image sensor configured to perform imaging, and at least one processor and a memory coupled to the at least one processor, the memory having instructions that, when executed by the processor, perform operations as a control unit configured to perform precapture imaging, when acquiring a first imaging instruction, to cause the first image sensor to repeatedly perform imaging, and causes the first image sensor to perform main imaging when acquiring a second imaging instruction during the precapture imaging, and a first detecting unit configured to detect a change in a main object to be focused, and to output information about the change in the main object. The control unit changes control in the precapture imaging using the information about the change in the main object.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Referring now to the accompanying drawings, a detailed description will be given of embodiments according to the disclosure. Corresponding elements in respective figures will be designated by the same reference numerals, and a duplicate description thereof will be omitted.

Figure 1:
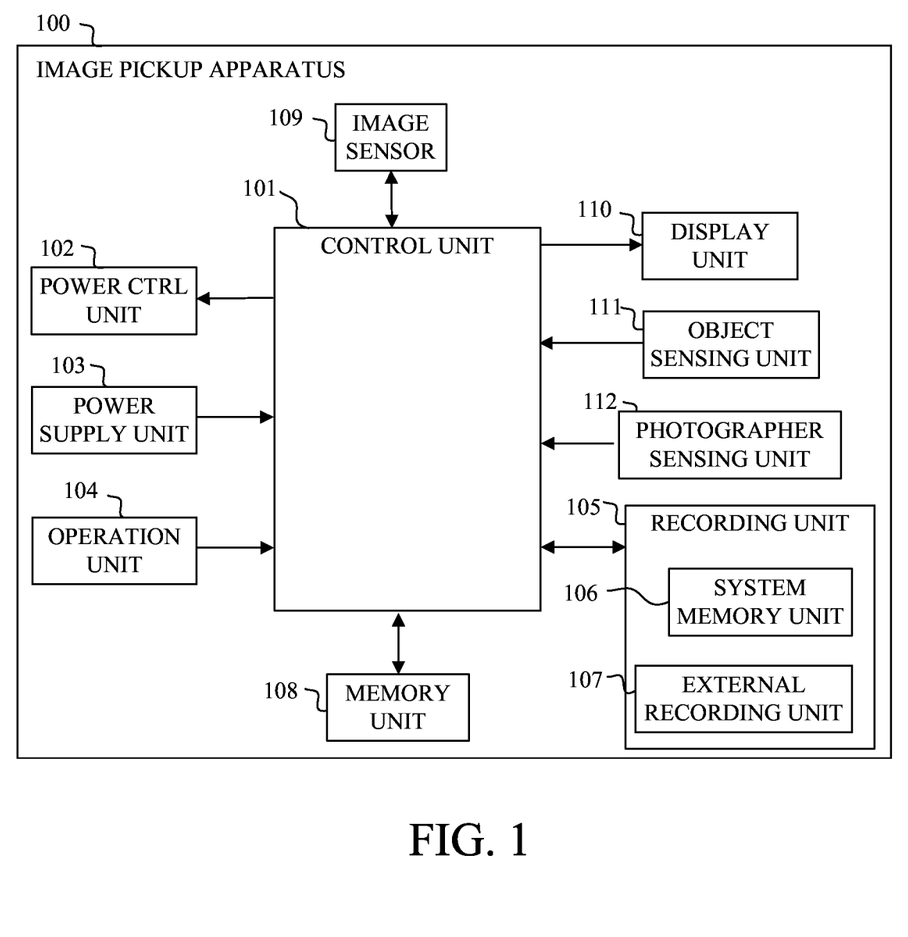
FIG. 1 is a block diagram illustrating a hardware configuration of an image pickup apparatus according to one embodiment of the disclosure.

FIG. 1 is a block diagram illustrating the hardware configuration of an image pickup apparatus 100 according to one embodiment of the disclosure. The image pickup apparatus 100 includes a control unit 101, a power control unit 102, a power supply unit 103, an operation unit 104, a recording unit 105, a memory unit 108, an image sensor 109, a display unit (notification unit) 110, an object sensing unit (first detecting unit) 111 and a photographer sensing unit (second detecting unit) 112.

The control unit 101 includes at least one processor, reads a program for controlling the image pickup apparatus 100 from the memory unit 108, and loads part of the program into a system memory unit 106, which will be described below, thereby controlling the entire image pickup apparatus 100.

The power control unit 102 includes a battery detecting circuit, a protection circuit, a DC-DC converter, an LDO regulator, etc., and supplies voltage to the electronic devices in the image pickup apparatus 100 using power supplied from the power supply unit 103.

The power supply unit 103 includes secondary batteries such as NiCd batteries, NiMH batteries, and Li batteries, an AC adapter, and the like. The power supply unit 103 can acquire the remaining battery charge, and outputs the acquired remaining battery charge to the control unit 101.

The operation unit 104 includes one or more of a switch, a dial, a touch panel, a voice recognition device, and the like, and is used to input various predetermined operation instructions to the control unit 101. A release button included in the operation unit 104 includes a two-stage switch serving as a first release switch and a second release switch. In a case where the first release switch is turned on by the first-stage pressing operation, a first imaging instruction is output to the control unit 101. In a case where the second release switch is turned on by the second stage pressing operation, a second imaging instruction is output to the control unit 101.

The recording unit 105 includes a system memory unit (first recording unit) 106 and an external recording unit (second recording unit) 107. The system memory unit 106 includes a RAM or the like, and loads a program and constants and variables for the operation of the control unit 101 from the memory unit 108. The system memory unit 106 temporarily stores images during precapture imaging, and when its capacity becomes full, deletes the oldest image and sequentially stores new images. The external recording unit 107 is a removable recording medium such as a semiconductor memory, and records images obtained by precapture imaging or main (or actual) imaging.

The memory unit 108 is an electrically erasable/storable nonvolatile memory such as an electrically erasable programmable read-only memory (EEPROM), and stores constants, programs, etc. for the operation of the control unit 101.

The image sensor 109 is a CMOS, CCD, or the like, performs imaging based on an instruction from the control unit 101, and outputs information about the acquired image to the control unit 101.

The display unit 110 displays an operation status, a message, etc., using a character, an image, a sound, etc., according to an instruction from the control unit 101.

The object sensing unit 111 detects a change in the main object to be focused, and outputs information about the change in the main object to the control unit 101. The object sensing unit 111 includes an event-based vision sensor that outputs information about the change in the main object according to a luminance change in a pixel, an imaging sensor different from the image sensor 109, or the like. The object sensing unit 111 may detect the change in the main object using an image acquired from the image sensor 109 via the control unit 101.

The photographer sensing unit 112 includes a rear camera configured to capture the photographer, a shake detecting sensor configured to detect a shake amount of the photographer, and a grip sensor configured to detect whether the image pickup apparatus 100 is being held, and outputs information about the photographer to the control unit 101.

First Embodiment

Figure 2:
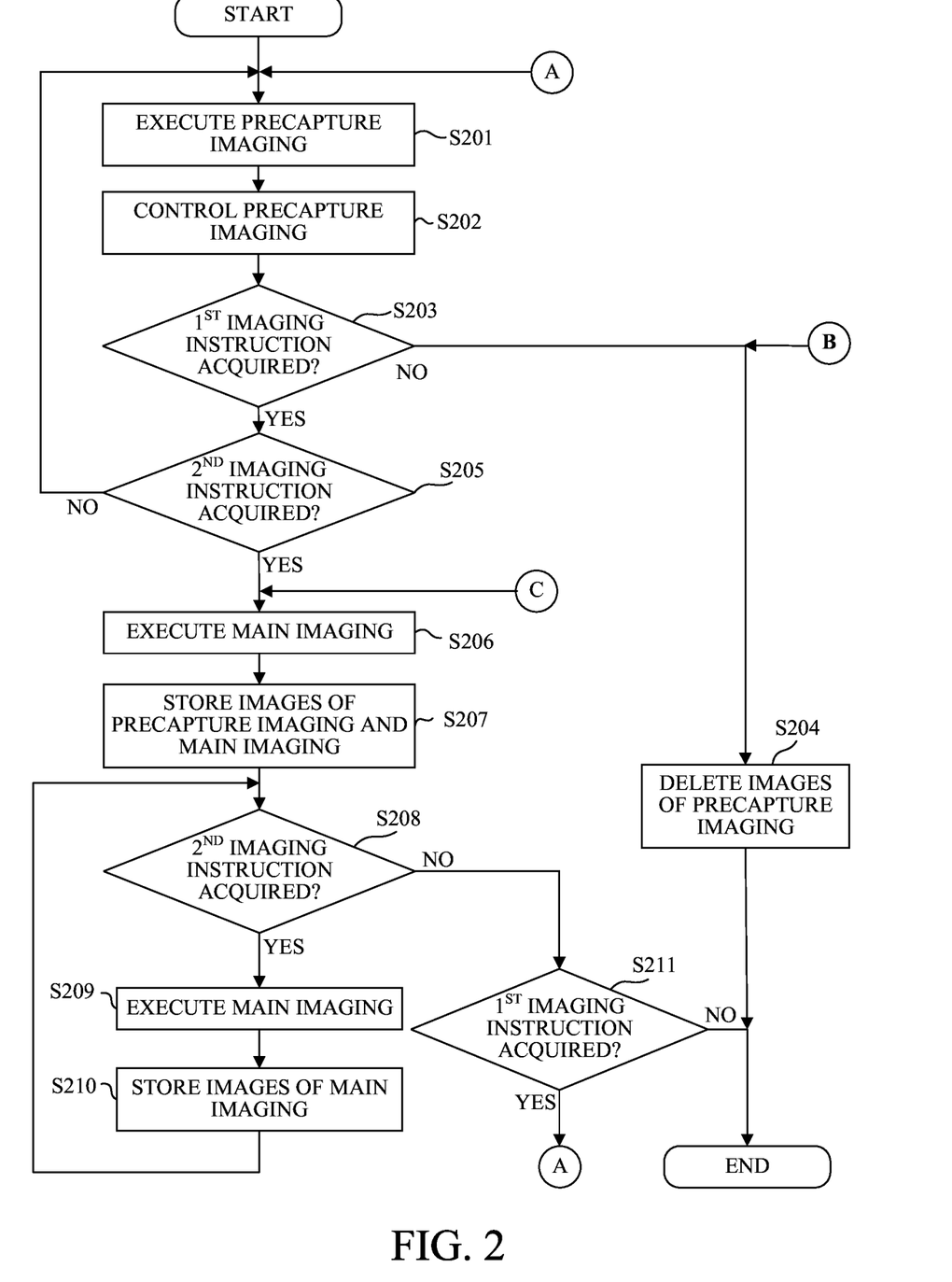
FIG. 2 is a flowchart illustrating processing of the image pickup apparatus according to first and second embodiments.

This embodiment will discuss an example of a control method for the image pickup apparatus 100. FIG. 2 is a flowchart illustrating processing of the image pickup apparatus 100 according to this embodiment.

The flow in FIG. 2 starts in a case where the control unit 101 acquires the first imaging instruction output by pressing the first release switch.

In step S201, until the control unit 101 acquires the first imaging instruction, the control unit 101 performs precapture imaging that causes the image sensor 109 to continuously perform imaging, and temporarily stores images corresponding to the number of shots (or captures) in the precapture imaging ("precapture shots" hereinafter) in the system memory unit 106 as images acquired by precapture imaging ("precapture images" hereinafter). In a case where the number of stored precapture images reaches the upper limit of the number of precapture shots, the oldest precapture image is deleted and the newest precapture image is stored. The number of precapture shots may be the number of shots at which the capacity of the system memory unit 106 becomes full, or may be a predetermined number of shots. The number of precapture shots may be set by the photographer.

Figure 3:
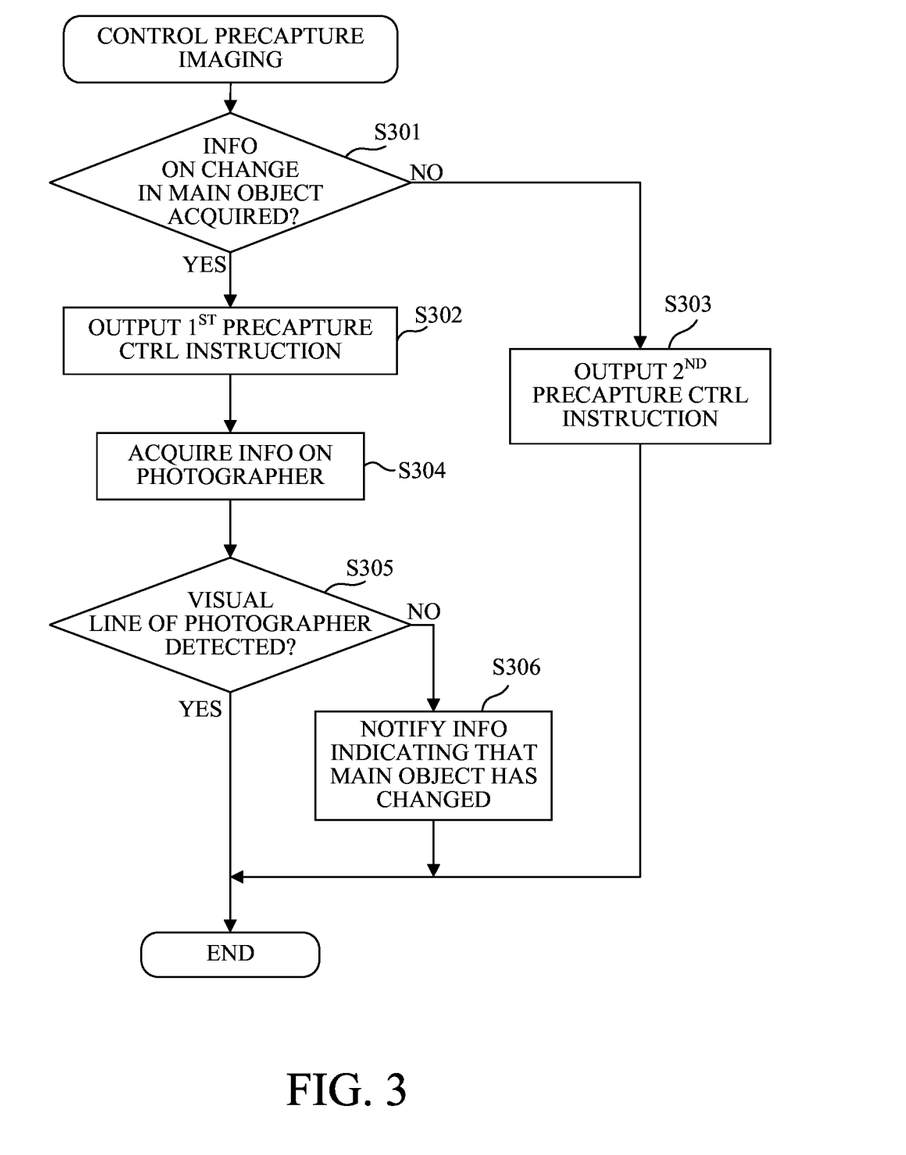
FIG. 3 is a flowchart illustrating precapture imaging control processing according to the first embodiment.

In step S202, the control unit 101 performs precapture imaging control. FIG. 3 is a flowchart illustrating the precapture imaging control processing according to this embodiment.

In step S301, the control unit 101 determines whether or not the information about the change in the main object has been acquired from the object sensing unit 111. In this embodiment, the object sensing unit 111 includes an event-based vision sensor. Thus, event information (information about a pixel having luminance change) is output when luminance change (event hereinafter) occurs in the pixel as information about the change in the main object. The event information includes, for example, the position coordinates of the pixel where the event has occurred, the polarity (positive or negative) of the luminance change, and the timing information corresponding to the event time. In a case where it is determined that the information about the change in the object has been acquired, the flow proceeds to step S302, otherwise, the flow proceeds to step S303.

In step S302, the control unit 101 outputs a first precapture control instruction (first control instruction) to the image sensor 109 so that the image sensor 109 transitions to a first imaging state (first state).

In step S303, the control unit 101 outputs a second precapture control instruction (second control instruction) to the image sensor 109 so that the image sensor 109 transitions to a second imaging state (second state).

A description will now be given of the first imaging state and the second imaging state. The second imaging state is a state in the precapture imaging that makes at least one parameter of a frame rate, recording image quality, and the number of precapture shots lower (smaller) than that of the first imaging state, so as to lower the power consumption. The second imaging state can reduce the power consumption of the image pickup apparatus 100 and provide precapture imaging for an imaging scene in which the main object does not change. For example, in a case where the frame rate in the second imaging state is made lower than that of the first imaging state, the number of shots per unit time can be reduced. Thus, the second imaging state can reduce the power consumption of the image sensor 109 that acquires an image and transfers it to the control unit 101, the control unit 101 that processes the acquired image, and the external recording unit 107 that records the image acquired by main imaging. In a case where the recording image quality in the second imaging state is made lower than that of the first imaging state, the image size read out of the image sensor 109 per frame can be reduced. Thus, the second imaging state can reduce the power consumption of the image sensor 109, the control unit 101, and the external recording unit 107. In a case where the number of precapture shots in the second imaging state is made smaller than that of the first imaging state, the number of images stored in the system memory unit 106 during precapture imaging can be reduced. Thus, the second imaging state can reduce the power consumption of recording images in the external recording unit 107.

In this embodiment, in a case where the second precapture control instruction is acquired and it is determined that the main object has not changed, the image sensor 109 may transition to the second imaging state and the precapture imaging may be stopped. After the precapture imaging is stopped, the precapture imaging may be resumed in a case where the first precapture control instruction is acquired and it is determined that the main object has changed. In a case where a predetermined time has passed after the precapture imaging is stopped, the precapture images stored in the system memory unit 106 may be determined unnecessary and deleted.

In step S304, the control unit 101 acquires information about the photographer from the photographer sensing unit 112. In this embodiment, the photographer sensing unit 112 includes the rear camera configured to capture the photographer, and outputs, as information about the photographer, an image of the photographer (whether the photographer is facing the image pickup apparatus 100) to the control unit 101.

In step S305, the control unit 101 determines whether or not the visual line of the photographer has been detected using the information about the photographer acquired from the photographer sensing unit 112. In a case where it is determined that the visual line of the photographer has been detected, this flow ends and the flow proceeds to step S203 in FIG. 2, otherwise, the flow proceeds to step S306. The control unit 101 detects the visual line of the photographer in this embodiment, but may detect the orientation of the face or body of the photographer.

In step S306, the control unit 101 notifies the photographer of information indicating that the main object has changed. In this embodiment, the control unit 101 notifies the above information using the display unit 110.

Figure 4A:
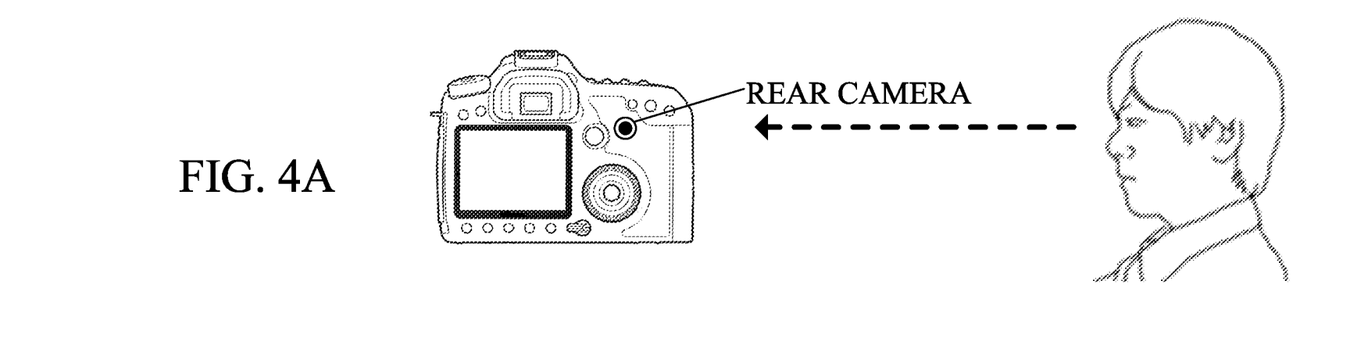
FIGS. 4A and 4B explain visual line detection according to the first and second embodiment.
Figure 4B:
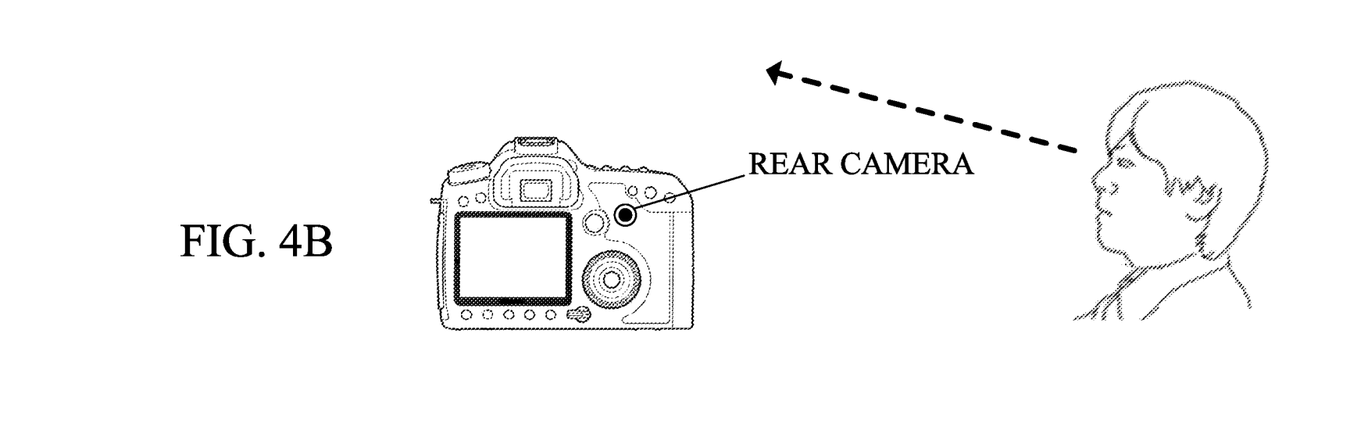

Referring now to FIGS. 4A and 4B, a description will be given of the processing of steps S305 and S306. FIGS. 4A and 4B illustrate visual line detection. As illustrated in FIG. 4A, in a case where the visual line of the photographer is detected using an image captured by the rear camera, the control unit 101 determines that the photographer has a high imaging intention. On the other hand, as illustrated in FIG. 4B, in a case where the visual line of the photographer cannot be detected, the control unit 101 determines that the photographer has a low or no imaging intention. In a case where the main object has changed in a scene in which the photographer has little or no imaging intention, the photographer may miss a photo opportunity. Accordingly, in step S306, this embodiment notifies the photographer of information indicating that the main object has changed, thereby encouraging the photographer to capture an image without losing the photo opportunity.

In step S203, the control unit 101 determines whether or not the first imaging instruction has been acquired. In a case where it is determined that the first imaging instruction has been acquired, the flow proceeds to step S205, otherwise the flow proceeds to step S204.

In step S204, the control unit 101 deletes precapture images stored in the system memory unit 106, and ends this flow.

In step S205, the control unit 101 determines whether or not a second imaging instruction output by pressing the second release switch has been acquired during the precapture imaging. In a case where it is determined that the second imaging instruction has been acquired, the flow proceeds to step S206, otherwise, the flow returns to step S201.

In step S206, the control unit 101 performs main imaging. The main imaging is normal single-shot imaging that produces one frame of an image, which is different from the precapture imaging.

In step S207, the control unit 101 stores the precapture images stored in the system memory unit 106 and the actually captured image acquired in the main imaging in step S206 in the external recording unit 107. After these images are stored, all precapture images stored in the system memory unit 106 are deleted.

In step S208, the control unit 101 determines whether or not the second imaging instruction has been acquired. In a case where it is determined that the second imaging instruction has been acquired, the flow proceeds to step S209, otherwise, the flow proceeds to step S211.

In step S209, the control unit 101 performs main imaging.

In step S210, the control unit 101 stores the actually captured image acquired by the main imaging in step S209 in the external recording unit 107.

In step S211, the control unit 101 determines whether or not the first imaging instruction has been acquired. In a case where it is determined that the first imaging instruction has been acquired, the flow returns to step S201, otherwise, this flow ends.

As described above, the configuration according to this embodiment can change the parameter in the precapture imaging according to the change in the main object. Thereby, in a case where the main object does not change, unnecessary power consumption and capacity shortage of the recording unit can be suppressed. In addition, the photographer can easily organize images. Furthermore, after the main object changes, a desired image can be easily acquired.

Although the object sensing unit 111 includes the event-based vision sensor in this embodiment, it may be configured to be able to detect a change in the main object by another imaging sensor configured to provide imaging at an angle wider than that of the image sensor 109.

Second Embodiment

This embodiment will discuss another example of the control method of the image pickup apparatus 100. The configuration according to this embodiment is basically similar to that of the first embodiment, but the precapture imaging control is different. This embodiment will describe only the configuration different from that of the first embodiment, and a description of the configuration similar to that of the first embodiment will be omitted.

Figure 5:
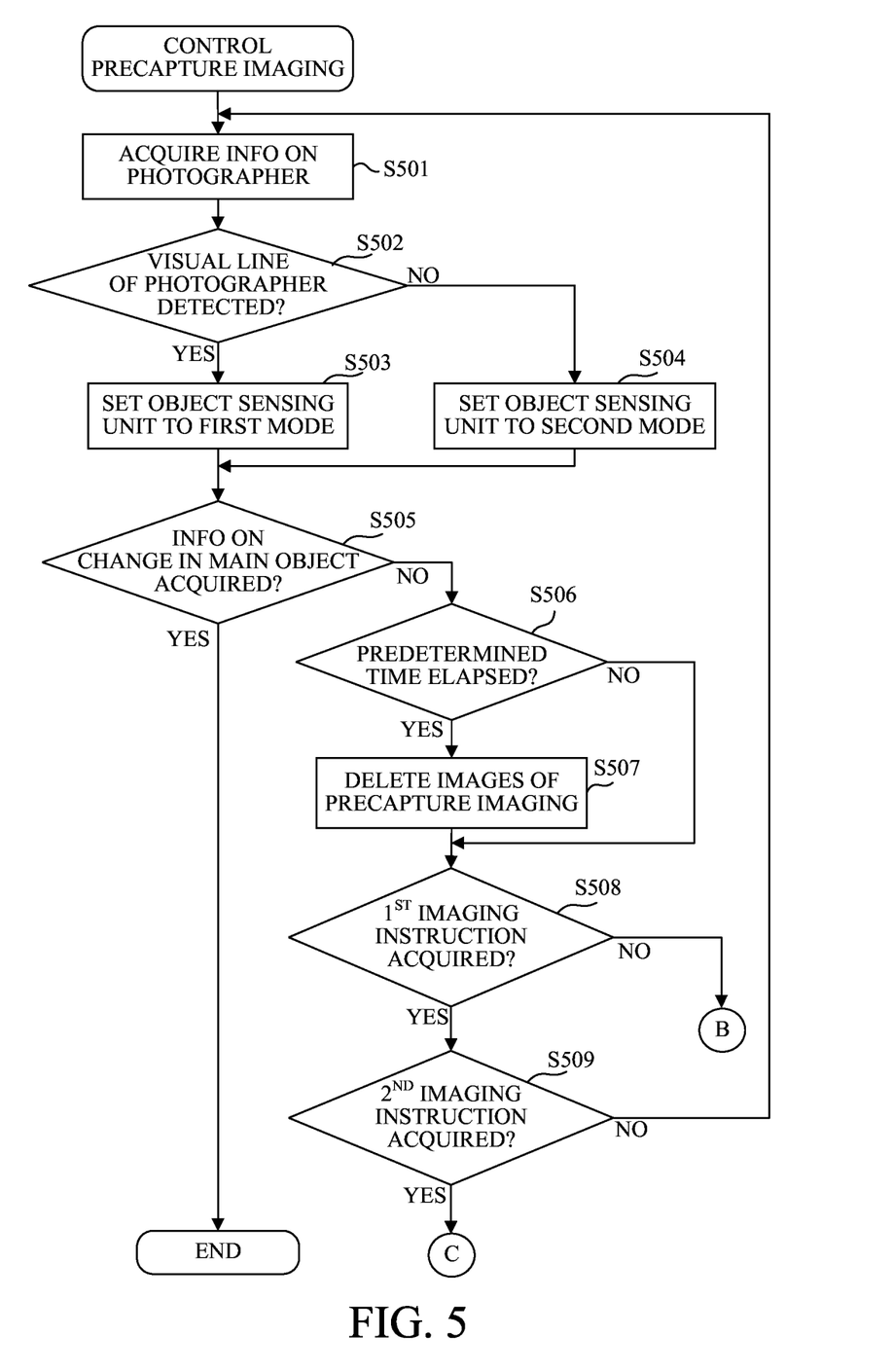
FIG. 5 is a flowchart illustrating precapture imaging control processing according to the second embodiment.

FIG. 5 is a flowchart illustrating processing of the image pickup apparatus 100 according to this embodiment. In this embodiment, the object sensing unit 111 is another image sensor (second image sensor) configured to provide imaging at an angle wider than that of the image sensor 109, and to detect an entry of a main object into a sensing range (detecting range) by calculating a difference between frames of a plurality of images.

In step S501, the control unit 101 acquires information about the photographer from the photographer sensing unit 112. In this embodiment, the photographer sensing unit 112 includes the rear camera configured to capture the photographer, and output the image of the photographer to the control unit 101 as information about the photographer.

In step S502, the control unit 101 determines whether the visual line of the photographer has been detected using the information about the photographer acquired from the photographer sensing unit 112. In a case where it is determined that the visual line of the photographer has been detected, the flow proceeds to step S503, otherwise, the flow proceeds to step S504. The control unit 101 detects the visual line of the photographer in this embodiment, but may detect the orientation of the face or body of the photographer.

In step S503, the control unit 101 sets the object sensing unit 111 to a first mode in which the sensing range is narrowed to the visual line range. The control unit 101 increases the imaging frame rate.

In step S504, the control unit 101 sets the object sensing unit 111 to a second mode in which the sensing range is widened. The control unit 101 maintains the original imaging frame rate.

Figure 6A:
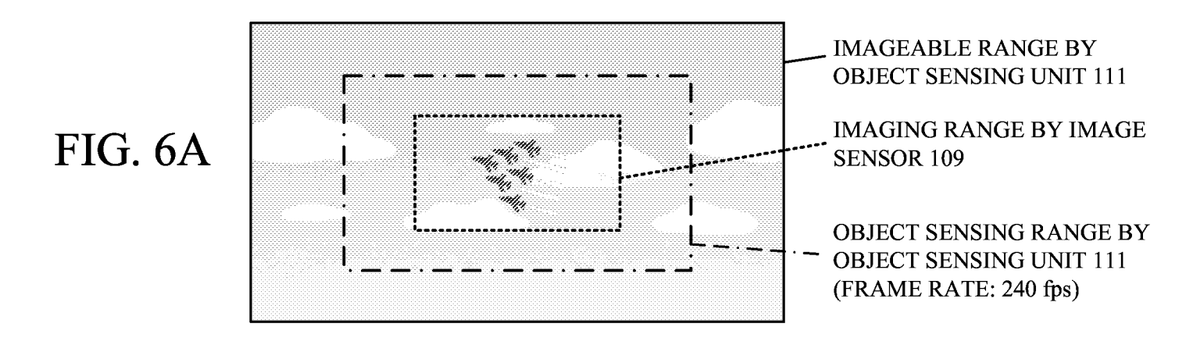
FIGS. 6A and 6B explain object sensing control changes.
Figure 6B:
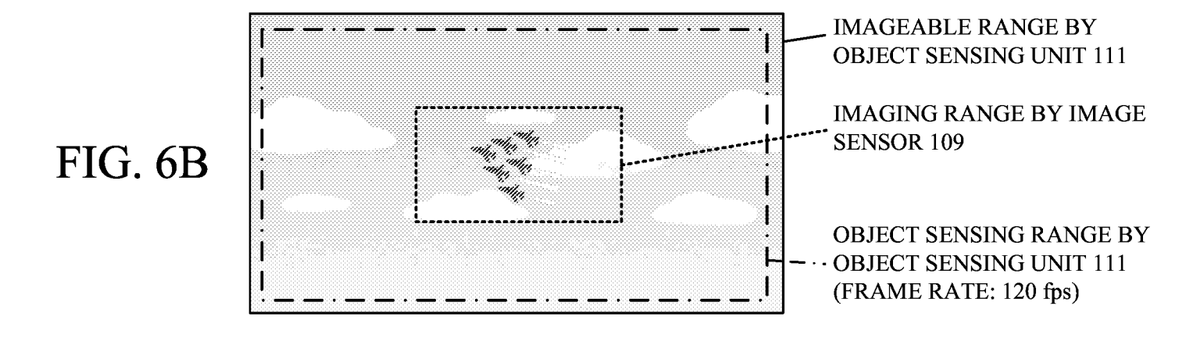

Referring now to FIGS. 6A and 6B, a description will be given of the processing of steps S503 and S504. FIGS. 6A and 6B explain object sensing control changes. In a case where the control unit 101 detects the visual line of the photographer using the image from the photographer sensing unit 112, the control unit 101 determines that the photographer has a strong imaging intention. At that time, as illustrated in FIG. 6A, by narrowing the sensing range of the object sensing unit 111 and increasing the frame rate, object changes can be detected in detail in scenes with a strong imaging intention and the imaging accuracy can be improved. On the other hand, in a case where the control unit 101 cannot detect the visual line of the photographer, the control unit 101 determines that the photographer has a low or no imaging intention. At that time, as illustrated in FIG. 6B, the successful imaging probability can be increased by widening the sensing range of the object sensing unit 111.

In step S505, the control unit 101 determines whether or not the information about the change in the main object has been acquired from the object sensing unit 111. In a case where the information about the change in the main object is acquired, this flow ends and proceeds to step S203 in FIG. 2, otherwise it is determined that the main object has not yet changed and the flow proceeds to step S506.

Figure 7A:
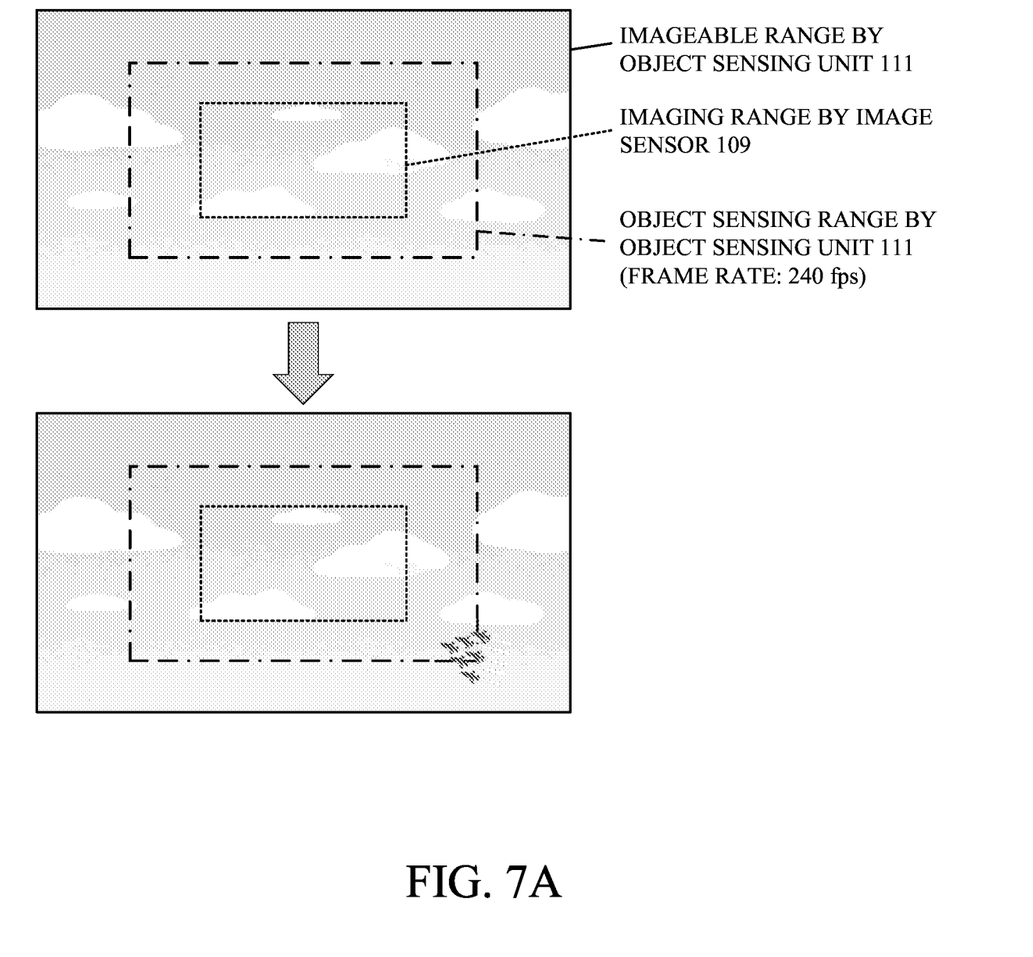
FIGS. 7A and 7B explain object sensing by an object sensing unit.
Figure 7B:
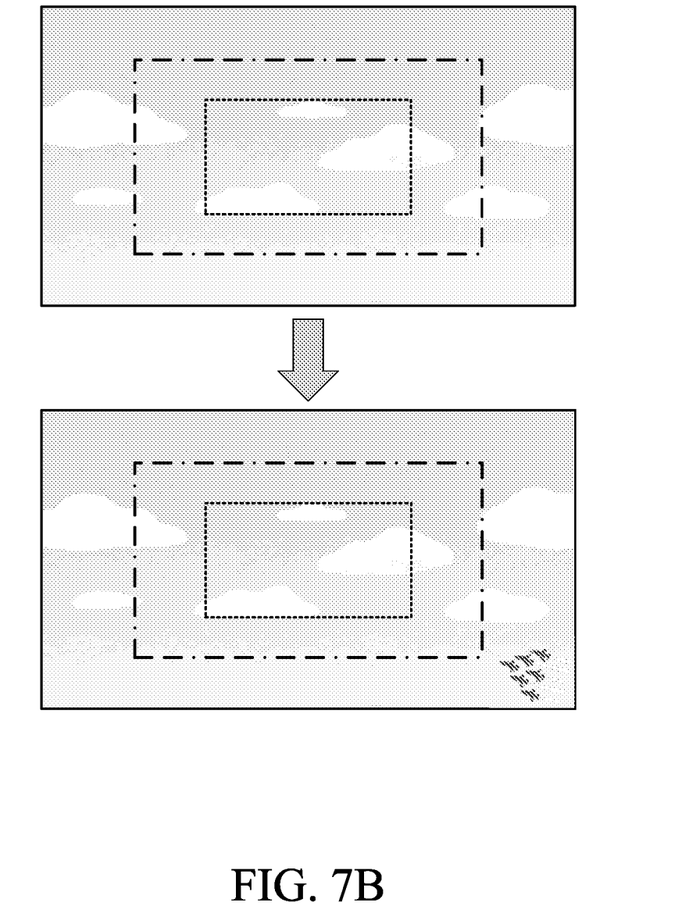

Referring now to FIGS. 7A and 7B, a description will be given of the processing of step S505. FIGS. 7A and 7B explain object sensing by the object sensing unit 111. In a case where the object sensing unit 111 acquires an image illustrated in FIG. 7A at a first timing and at a second timing next to the first timing during precapture imaging, the object sensing unit 111 detects an entry of a main object into the sensing range as a change in the main object. In this case, the object sensing unit 111 outputs information indicating the detection of the entry of the main object into the sensing range, to the control unit 101 as the information about the change in the object. On the other hand, in a case where the object sensing unit 111 acquires an image illustrated in FIG. 7B at the first timing and the second timing during the precapture imaging, the control unit 101 does not detect the entry of the main object into the sensing range. In this case, the object sensing unit 111 does not output to the control unit 101 the information indicating the detection of the entry of the main object into the sensing range.

In step S506, the control unit 101 determines whether a predetermined time has passed since it was determined in step S506 that the main object has not changed. In a case where it is determined that the predetermined time has passed, the flow proceeds to step S507, otherwise, the flow proceeds to step S508.

In step S507, the control unit 101 determines that the precapture images stored in the system memory unit 106 is unnecessary and deletes them.

In step S508, the control unit 101 determines whether or not the first imaging instruction output by pressing the first release switch has been acquired. In a case where it is determined that the first image capturing instruction has been acquired, the flow proceeds to step S509, otherwise, the flow proceeds to step S204 in FIG. 2.

In step S509, the control unit 101 determines whether or not the second imaging instruction output by pressing the second release switch has been acquired. In a case where it is determined that the second imaging instruction has been acquired, the flow proceeds to step S206 in FIG. 2, otherwise, the flow returns to step S501.

As described above, the configuration according to this embodiment determines whether or not to temporarily stop precapture imaging according to a change in a main object. Thereby, in a case where the main object does not change, unnecessary power consumption and capacity shortage of the recording unit can be suppressed. In addition, the photographer can easily organize images. Furthermore, after the main object changes, a desired image can be easily acquired.

In this embodiment, the object sensing unit 111 includes an image sensor different from the image sensor 109 and can detect object changes by capturing an image at an angle wider than that of the image sensor 109, but the disclosure is not limited to this embodiment. For example, the object sensing unit 111 may be able to detect a change in the main object using a sensor with a frame rate higher than that of the image sensor 109, or may be able to detect a change in the main object using an image acquired by the image sensor 109.

This embodiment can provide an image pickup apparatus that can suppress unnecessary power consumption and capacity shortage of the recording unit, and easily capture an image as intended by the photographer.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-046958, filed on Mar. 23, 2022, which is hereby incorporated by reference herein in its entirety.

What is claimed is:

1. An image pickup apparatus comprising:
a first image sensor configured to perform imaging;
at least one processor and a memory coupled to the at least one processor, the memory having instructions that, when executed by the processor, perform operations as a control unit configured to perform precapture imaging, when acquiring a first imaging instruction, to cause the first image sensor to repeatedly perform imaging, and causes the first image sensor to perform main imaging when acquiring a second imaging instruction during the precapture imaging; and
a first detecting unit configured to detect a change in a main object to be focused, and to output information about the change in the main object,
wherein the control unit changes control in the precapture imaging using the information about the change in the main object.

2. The image pickup apparatus according to claim 1, further comprising:
a first recording unit configured to temporarily record an image acquired by the precapture imaging when the control unit acquires the first imaging instruction; and
a second recording unit configured to record the image acquired by the precapture imaging and an image acquired by the main imaging when the control unit acquires the second imaging instruction.

3. The image pickup apparatus according to claim 1, further comprising an operation unit configured to output the first imaging instruction in response to a first-stage pressing operation, and outputs the second imaging instruction in response to a second-stage pressing operation.

4. The image pickup apparatus according to claim 1, wherein the first detecting unit outputs to the control unit information about a pixel included in the first image sensor where luminance has changed as the information about the change in the main object when the luminance has changed in the pixel, and
wherein the control unit outputs a first control instruction to the first image sensor so as to transfer the first image sensor to a first state in a case where the control unit acquires the information about the pixel, and outputs a second control instruction to the first image sensor so as to transfer the first image sensor to a second state in which power consumption is smaller than that of the first state in a case where the control unit does not acquire the information about the pixel.

5. The image pickup apparatus according to claim 1, wherein the first detecting unit includes a second image sensor different from the first image sensor, and configured to output information about detection of an entry of the main object into a detecting range as the information about the change in the main object when detecting that the main object has entered the detecting range of the second image sensor, and
wherein in a case where the control unit acquires the information about the detection of the entry of the main object into the detecting range, the control unit outputs a first control instruction to the first image sensor to transfer the first image sensor to a first state, and in a case where the control unit does not acquire the information about the detection of the entry of the main object into the detecting range, the control unit outputs a second control instruction to the first image sensor to transfer the first image sensor to a second state in which power consumption of the first image sensor is lower than that of the first state.

6. The image pickup apparatus according to claim 5, further comprising a second detecting unit configured to output to the control unit information for detecting whether a photographer is facing the image pickup apparatus,
wherein the control unit changes at least one of a detecting range and a frame rate of the first detecting unit using the information from the second detecting unit.

7. The image pickup apparatus according to claim 4, further comprising:
a second detecting unit configured to output to the control unit information for detecting whether a photographer is facing the image pickup apparatus; and
a notification unit configured to notify the photographer of information indicating that the main object has changed in a case where the control unit outputs the first control instruction to the first image sensor and it is determined based on the information from the second detecting unit that the photographer is not facing the image pickup apparatus.

8. The image pickup apparatus according to claim 1, wherein the control unit stops the precapture imaging when determining that the main object has not changed, and resumes the precapture imaging when determining that the main object has changed after the precapture imaging is stopped.

9. The image pickup apparatus according to claim 8, wherein the control unit deletes all images acquired in the precapture imaging a predetermined time after the first image sensor stopped the precapture imaging.

* * * * *